United States Patent Office 3,442,874
Patented May 6, 1969

3,442,874
PROCESS FOR THE PRODUCTION OF
POLYTHIOFORMALDEHYDE
Helmut Birkner and Franz Sturzenhofecker, Marl,
Germany, assignors to Chemische Werke Huls
Aktiengesellschaft, Marl, Kreis Recklinghausen,
Germany, a corporation of Germany
No Drawing. Filed May 18, 1964, Ser. No. 368,386
Claims priority, application Germany, Jan. 28, 1964,
C 31,988
Int. Cl. C08g 1/04, 23/00
U.S. Cl. 260—79          2 Claims

ABSTRACT OF THE DISCLOSURE

High molecular weight polythioformaldehyde is made by polymerization of trithiane dispersed in a non-solvent inert liquid at a temperature in the range from 200–260° C. in the presence of cationically acting catalyst.

---

A variety of methods have been proposed for the production of polythioformaldehyde of high molecular weight. Thus, for example, sodium sulfide can be condensed with bis-(chloromethyl)-sulfide or methanedithiol can be subjected to self-polycondensation under suitable conditions or trithiane which is the trimer of the unstable thioformaldehyde can be polymerized in the presence of cationically acting catalysts in the absence of solvents.

The last named process appears to be especially rewarding since the required trithiane can be produced relatively simply and of the necessary purity. However in block polymerization the substantial sublimation of the trithiane which takes place when the trithiane is melted and requires special precautions must be regarded as a disadvantage. Moreover this process permits only the production of very hard, compact polymer bodies which must be broken up and pulverized. Also the problem of withdrawing the heat liberated by the polymerization from the molten trithiane has not been satisfactorily solved. One may even use slowly acting catalysts but this expedient lessens only one of the mentioned disadvantages and gives rise to a new disadvantage in that it prolongs the reaction time.

The use of any solvent is defintely excluded.

Surprisingly it has now been found that high molecular weight polythioformaldehyde can be made quite simply by the polymerization of trithiane with cationically acting catalysts at temperatures within the range from 200 to 260° C. while avoiding all of the above mentioned disadvantages by using the trithiane in the form of a dispersion in an organic, inert material in which the trithiane is not soluble and which is liquid at the reaction temperature.

A variety of materials are suitable for use as the cationically active catalyst such as Lewis acids e.g. tin tetrachloride, boron trifluoride, titanium tetrachloride, aluminum chloride and antimony pentachloride, also their complexes with oxygen and sulfur containing compounds e.g. boron trifluoride-etherate and boron trifluoride-tetrahydrofuran etherate and also their salts e.g. oxonium salts such as triethyl-oxonium-fluoborate, also aryldiazonium fluoborates such as p-nitrophenyl-diazonium-fluoborate and also strong acids such as p-toluene sulfonic acid, trifluoroacetic acid and perchloroic acid.

The reaction takes place in the temperature range at which the dispersed trithiane is molten or near the melting point, suitably between 200° and 260° C. and preferably between 220° and 230° C. In order to avoid undesired by-products the reaction is carried out under an inert gas, suitably nitrogen.

Organic, inert materials which are liquid at the reaction temperature and which do not dissolve the trithiane may be used as the dispersion medium. Aliphatic and alicyclic hydrocarbons such as n-dodecane, paraffine oil and cyclododecane are preferred. These dispersion media are best suited for operation at normal pressure. Lower boiling hydrocarbons such as octane, hexane and cyclohexane may be used when the reaction is carried out at superatmospheric pressure. Silicone oils such as the products available under the trade names "Siliconöl Bayer M 40" and "Silicon AK 35" of the Wacker-Chemie GmbH may be used.

The trithiane advantageously is dispersed by covering it in the reaction vessel with the dispersing medium and then melting the trithiane by heating without stirring. In this way only a very small part of the trithiane is sublimed whereas ordinarily when it is not covered with a non-solvent it sublimes strongly at temperatures far below the melting point.

After the trithiane has been melted as described above the contents of the reaction vessel is stirred so vigorously that a homogeneous emulsion is formed. The stability of this emulsion can be improved by the addition of stabilizers. Suitable stabilizers are especially the polyalkylene oxides such as polyethylene oxide having an average molecular weight of from 500 to 2000. The stabilizer may be used in amounts within the range from 0.1 to 20%, preferably 1 to 10% based upon the weight of the trithiane.

The polymerization starts in a short time after the addition of the catalyst and is complete in a few minutes. Upon cooling the product is in the form of almost colorless beads or granules of fairly uniform size.

As distinguished from mass polymerization the process of the present invention can be carried out in any suitable container since the polymer precipitates in finely divided form and readily can be removed from the container. Moreover, generally, a further subdivision of the product is not necessary for purification.

For working up the product it is suction filtered, heated in a high boiling solvent for the trithiane and the resulting mixture is filtered while still hot. By this operation undesired, ill-smelling by-products and unreacted trithiane are separated from the product. Suitable solvents for this purification are toluene, xylene, anisol and mono, di and trichloro-benzenes.

The polythioformaldehyde made as described above is insoluble in the usual organic solvents but is soluble at 200° C. in tetramethylene sulfon, α-bromonaphthalene and quinoline. It melts at about 240–260° C. and may be worked into molded bodies in the vicinity of the melting point.

As distinguished from the unstable paraformaldehyde the polythioformaldehyde exhibits a substantially greater heat resistance and a noteworthy resistance to acids, lyes and atmospheric oxygen.

In the following examples, unless otherwise indicated, the parts are by weight.

Example 1

50 parts of purified, dry trithiane was introduced into a three necked flask equipped with a stirrer, reflux cooler and gas inlet tube and covered with 100 parts of n-dodecane, air was expelled from the flask with a stream of nitrogen and then with continuous stirring the trithiane was melted by heating up to 220° C. The molten trithiane was homogeneously mixed with the hydrocarbon by vigorous stirring. 0.025 part of borotrifluoride-etherate was added and the polymerization started within a few seconds as evidenced by the formation of fine oily polymer droplets. After one minute the mixture was cooled whereupon the droplets solidified into small granules. The crude product was separated by suction filtration and twice heated up with o-dichlorobenzene and separated again by filtration. After washing with methanol and drying in vacuum at 100° C., 38.5 parts of a practically odorless and colorless polymer having a melting point of 256° C. was recovered. It was pressed into a hard plate at a temperature of 250–260° C. and a pressure of 150–200 kg./cm.$^2$.

Example 2

100 parts of recrystallised, dry trithiane was melted under 100 parts of paraffine oil in a stream of nitrogen and homogeneously mixed therewith by vigorous stirring at 220–230° C. and then with an addition of 0.1 part of borofluoride-etherate was polymerized within 1 minute. The filtered polymer was washed with benzene and methanol and finally extracted twice by boiling with o-dichlorobenzene. The yield was 52 parts of a high molecular weight polythioformaldehyde which melted at 236–239° C.

Example 3

As in Example 1, 50 parts of pure trithiane were melted under 100 parts of n-dodecane under nitrogen and the dispersion produced by vigorous stirring at 220° C. was treated with 0.025 part of p-nitrophenyl-diazonium-fluoborate. The polymerization which started in a few seconds was complete in a minute. After working up as described in Example 1, 26 parts of polythioformaldehyde having a melting point of 242° C. was recovered.

Example 4

100 parts of pure trithiane and 5 parts of polyethylene oxide (average molecular weight 1000) were covered with 200 parts of paraffine oil and melted under nitrogen and emulsified with the hydrocarbon by stirring. Upon the addition of 0.15 part of tin tetrachloride, polythioformaldehyde precipitated within one minute in an especially uniform distribution. After working up 72 parts of a product having a melting point of 259° C. was recovered. Its sieve analysis was as follows:

| Mm.: | Parts |
|---|---|
| 1 to 3 | 43.8 |
| 0.5 to 1 | 22.0 |
| 0.25 to 0.5 | 4.7 |
| <0.25 | 1.5 |

Example 5

100 parts of pure trithiane, 100 parts of a silicone oil available under the trade name Siliconöl Bayer M40 and 5 parts of polyethylene oxide (average molecular weight 1000) were heated under nitrogen until the trithiane was melted and then homogeneously mixed at 220° C. by vigorous stirring. 0.05 part of tin tetrachloride was added and after 3 minutes the mixture was permitted to cool. The usual working up gave 84 parts of a slightly gray colored product having a melting point of 261–264° C.

We claim:

1. Process for the production of polythioformaldehyde which comprises dispersing molten trithiane in an inert organic material which is liquid at and in which the trithiane is not soluble at a temperature of from 200 to 260° C., mixing a cationically acting catalyst with said dispersion at said temperature and in the absence of solvent, agitating the mixture so vigorously as to emulsify the mixture, and thereafter recovering the polythioformaldehyde from the resulting mixture.

2. Process as defined in claim 1 in which the inert organic material is a member selected from the group consisting of aliphatic and alicyclic hydrocarbons and silicone oils.

References Cited

UNITED STATES PATENTS

| 3,350,367 | 10/1967 | Wakasa et al. | 260—79 |
| 3,218,300 | 11/1965 | Kullmar et al. | 260—79 |
| 2,989,505 | 6/1961 | Hudgin et al. | |
| 2,989,508 | 6/1961 | Hudgin et al. | |
| 3,313,765 | 4/1967 | Roberts et al. | |

OTHER REFERENCES

Kern et al., English translation from Angewandte Chemie, 73 (6), March 1961, pp. 177–186, pp. 11–13, QD 25.

Okamura et al., English translation from Journal Chemical Society, Industrial Section, Japan, 65 (5), 1962, pp. 712–716, pp. 3 and 4.

Gipstein et al., Journal of Polymer Science, 1 (Pt. B), 1963, pp. 237–239.

WILLIAM H. SHORT, *Primary Examiner.*

L. M. PHYNES, *Assistant Examiner.*

U.S. Cl. X.R.

260—67